United States Patent [19]

Zagorodnaya et al.

[11] 4,316,114
[45] Feb. 16, 1982

[54] LOCKING STRUCTURE FOR ROTOR END WINDING OF A DISTRIBUTED POLAR ELECTRIC MACHINE

[76] Inventors: Galina A. Zagorodnaya; Garri M. Khutoretsky, both of Altaiskaya ulitsa, 20, kv. 5.; Gurgen P. Vartanian, Budapeshtskaya ulitsa, 15, korpus 2, kv. 29,, all of Leningrad, U.S.S.R.

[21] Appl. No.: 33,477

[22] Filed: Apr. 26, 1979

[51] Int. Cl.³ .............................................. H02K 3/46
[52] U.S. Cl. ..................................... 310/270; 310/214
[58] Field of Search ............... 310/270, 260, 214, 194, 310/261, 61, 59, 42; 336/197

[56] References Cited

U.S. PATENT DOCUMENTS

| | | | |
|---|---|---|---|
| 3,075,104 | 1/1963 | Willyoung | 310/61 |
| 3,476,966 | 11/1969 | Willyoung | 310/270 |
| 4,091,301 | 5/1978 | Blank | 310/270 |

FOREIGN PATENT DOCUMENTS

| | | | |
|---|---|---|---|
| 1145185 | 3/1963 | Fed. Rep. of Germany | 310/270 |
| 1538754 | 3/1970 | Fed. Rep. of Germany | 310/270 |
| 526986 | 11/1976 | U.S.S.R. | 310/270 |

*Primary Examiner*—R. Skudy
*Attorney, Agent, or Firm*—Myron Greenspan

[57] ABSTRACT

A locking structure for the rotor end winding of a distributed polar electric machine comprises a retaining ring embracing the rotor end winding and fixed on the rotor body by a shrink fit, and a locking ring preventing the retaining ring from axial shift with respect to the rotor body. The locking ring embraces both the retaining ring and the rotor body within their connection area and is secured firmly against radial shift with respect to both of them by the shrink fit. Said locking ring has bayonet joint portions on its inner surface at one of the end faces thereof, and has a bead at its other end face, serving as a thrust for a ring key. Mating portions of the bayonet joint are provided on the outer surface of the retaining ring, while the ring key is located on the rotor body.

1 Claim, 5 Drawing Figures

LOCKING STRUCTURE FOR ROTOR END WINDING OF A DISTRIBUTED POLAR ELECTRIC MACHINE

FIELD OF THE INVENTION

The invention relates to electrical machines, and more particularly to the locking structures for the rotor end winding of a distributed polar electric machines.

It is advantageous to use the invention for securing rotor end windings of turbo-generators.

BACKGROUND OF THE INVENTION

During operation of a distributed polar electric machines great axial forces arise due to thermal expansions of the rotor winding of said machines, great axial forces arise, which are transmitted to retaining rings embracing to rotor end windings, such forces tending to shift axially said rings with respect to the rotor body towards tail pieces thereof. This is particularly inherent in large turbo-generators.

Therefore, locking structures for the rotor end windings of large turbo-generators machines should be provided to prevent the retaining rings from shifting as mentioned above.

Known in the art is a locking structure for the rotor end winding of a distributed polar electric machine (cf. USSR Inventor's Certificate No. 216094, Int. cl. H02K 3/50). This locking structure comprises a retaining ring embracing the rotor end winding and fixed on the rotor body by a shrink fit, a locking ring preventing said retaining ring from axial shift with respect to the rotor body. The locking ring embraces both the retaining ring and the rotor body within their connection area and is fixed firmly against radial shift with respect to the retaining ring and to the body of the rotor by the shrink fit.

The locking ring has a thread on its inner surface at one end face thereof, and a bead at the other one, serving as a thrust end for a ring key.

A mating thread is provided on the outer surface of the retaining ring, while the ring key is secured on the rotor body in an annular groove formed on the outer surface of the rotor body.

The locking ring is fitted on the threaded surface of the retaining ring.

The locking structure assembly is performed as follows.

The locking ring is the first to be put on the rotor body. Then the ring key is inserted into the annular groove formed on the outer surface of the rotor body. The retaining ring is fitted afterwards on the rotor body and the preheated locking ring is screwed on the retaining ring until it is pressed against the ring key.

The combination of the threaded joint of the retaining ring with the locking ring and the key joint of the locking ring with the rotor body prevents the retaining ring from axially shifting with respect to the rotor body towards the tail piece thereof.

The locking structure disassembly is performed in a reverse order.

Such a construction, however, demands complicated assembly-disassembly techniques, in particular, turning the hot locking ring through 4 to 5 revolutions, aligning said locking ring with the retaining ring.

Moreover, the manufacture of said construction requires complicated specially designed equipment which leads to an increase in labour- consumption and cost.

Known also in the prior art is a locking structure for the rotor end winding of a distributed polar electric machine (cf. U.S. Pat. No. 2,960,360 and Great Brit. Pat. No. 893,890).

The aforementioned locking structure comprises a retaining ring embracing the rotor end winding, and a locking ring fixed on a rotor body by the shrink fit thereby preventing said retaining ring from axial shift with respect to the rotor body.

The retaining ring, on its inner end side facing the rotor body, has an annular groove wherein the locking ring is arranged. The locking ring over its inner surface has bayonet joint projections which can be freely brought into the rotor slots, it is also provided with a through transversal cut transforming the ring into a spring one.

An annular groove is provided on the rotor body in the vicinity of its end, wherein the locking ring can freely be placed, while slot wedges within the portion from the annular groove to the rotor body end face, have somewhat lower height, thereby forming mating bayonet joint projections.

The locking structure assembly is performed as follows.

The locking ring having spring properties is placed into the inner annular groove of the retaining ring. The retaining ring, in combination with the locking ring, is heated and is fitted onto the rotor body in such a manner as to cause the locking ring projections to move along the rotor body slots above the undersized slot wedges until complete insertion of the locking ring into the rotor body groove is performed. Then either the locking ring, or the retaining ring together with the locking ring, is turned one half the slot interval, so that the locking ring projections are engaged with those of the rotor body. Then the locking ring is fixed against the reverse turning.

The aforementioned locking ring and rotor body engagement prevents the retaining ring from axially shifting relative to the rotor body towards the tail piece thereof.

The locking structure disassembly is performed in a reverse order.

This construction is simpler concerning assembly-disassembly than the previously described device.

However, the disadvantage of the construction resides in a necessity of placing the locking ring inside the retaining one, and this may hamper the locking structure disassembly, specifically in the case of engineering and operational error the disassembly becomes impossible without the retaining ring rupture.

Moreover, loading of the retaining ring with additional centrifugal force developed by the locking ring appears to be a significant drawback of the construction under discussion.

There is also known in the art an improved locking structure for the rotor end winding of a distributed polar electric machine (cf. USSR Inventor's Certificate No. 541243, cl. H02K 3/50), which allows some reduction of the drawbacks mentioned above. This locking structure comprises a retaining ring embracing the rotor end winding, a locking ring embracing the retaining ring and serving to fit it onto the rotor body, the locking ring having bayonet joint portions on its inner surface at one end face thereof and a bead at the other end face, serving as a thrust for a ring key.

The locking ring embracing the retaining ring prevents the latter from axial shift.

However, such a construction of the rotor end winding locking structure of a distributed polar electric machine still has drawbacks of its own.

The bayonet joint formed on the rotor body requires an additional machining of one of the most heavy and costly parts involved, i.e. the rotor shaft, which can be performed only on heavy-duty unique machines. Moreover, it is known that under abnormal operating conditions, as well as in assembly-disassembly concerned with locking structure, damage of the bayonet joint portions may occur, including those portions disposed on the rotor body which may require remachining of the rotor shaft and, in extreme case, replacement thereof or abandonment of construction if damaged during the aformentioned job.

It is an object of the present invention to provide a rotor end winding locking structure of a distributed polar electric machine which eliminates the aforementioned disadvantages.

Another object of the present invention is to provide a rotor end winding locking structure of a distributed polar electric machine which simplifies engineering operations on assembly and disassembly thereof.

Still another object of the present invention is to provide a rotor end winding locking structure of a distributed polar electric machine which increases the reliability thereof.

With these and other objects in view, there is provided a locking structure for the rotor end winding of a distributed polar electric machine, comprising a retaining ring embracing the rotor end winding, a locking ring embracing said retaining ring and serving to fix it on the rotor body, said locking ring having bayonet joint portions on its inner surface at one end face thereof, and a bead on its other end face, serving as a thrust for a ring key, wherein, according to the invention, mating portions of the bayonet joint are formed on the outer surface of the retaining ring, while said ring key is located on the rotor body.

These and other objects and new peculiarities of the present invention are set forth in the appended claims, and the invention, just as from its design features, so from the principle of its performance, will now be more clearly understood from the detailed description of the preferred embodiment with accompanying drawings, which are thus becoming a part of the description. The invention will now be more clearly understood by way of example with reference to the accompanying drawings.

It is well understood, that the drawings only illustrate an exemplary embodiment of the invention and in no way limit its scope.

DESCRIPTION OF THE PREFERRED EMBODIMENT

Figure 1:
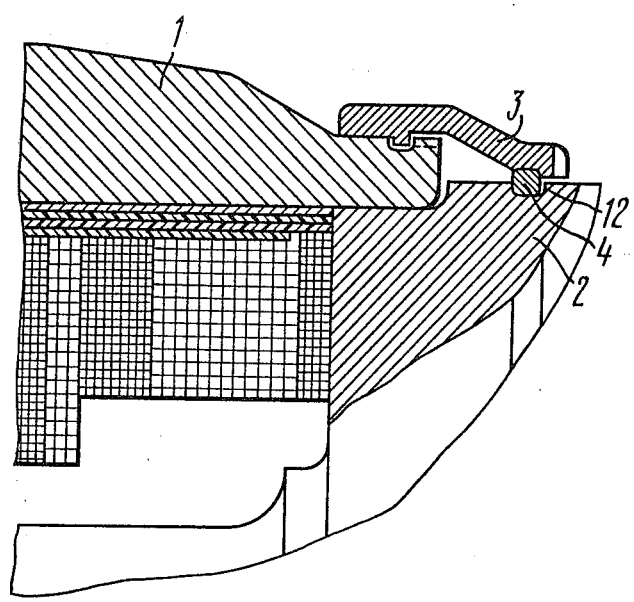
FIG. 1 represents schematically a rotor end winding locking structure of a distributed polar electric machine, longitudinal section.
Figure 2:
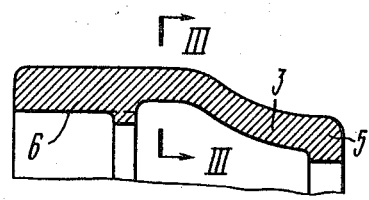
FIG. 2 shows a locking ring, partial section.

The rotor end winding locking structure of a distributed polar electric machine comprises a retaining ring 1 (FIG. 1) fitted on a rotor body 2 of the electric machine (not shown), a locking ring 3 and a ring key 4. On one side facing the transverse axis of the rotor body, the locking ring 3 has a ring bead 5 (FIG. 2) pressing against the ring key 4, and a cylindrical collar 6 on the opposite side, disposed on the inner surface of the locking ring 3.

Figure 3:
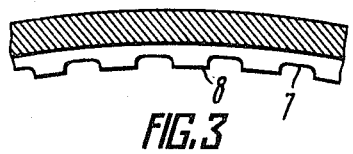
FIG. 3 is the locking ring of FIG. 2, taken along the line III—III of FIG. 2.

Adjacent to the cylindrical collar 6, on the inner surface of the locking ring 3, there are provided bayonet joint portions - longitudinal slots 7 (FIG. 3) and projections 8.

Figure 4:
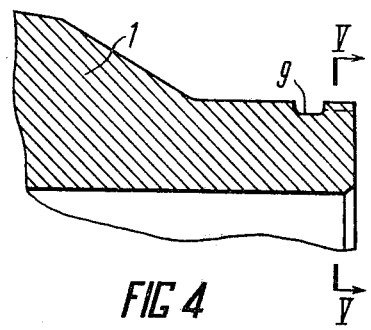
FIG. 4 shows a retaining ring, partial section.
Figure 5:
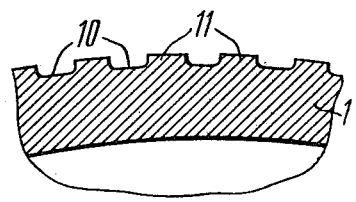
FIG. 5 is the retaining ring of FIG. 4, taken along the line V—V of FIG. 4.

On the outer surface of the retaining ring 1, there is provided an annular groove 9 (FIG. 4) with adjoiningly disposed mating bayonet joint portions, i.e. mating longitudinal slots 10 (FIG. 5) and mating projections 11. The size of the mating projections 11 of the bayonet joint on the retaining ring 1 are dimensioned to let them pass freely in the longitudinal slots 7 of the locking ring 3 as it moves axially with respect to the retaining ring 1. Similarly, the projections 8 of the locking ring 3 should freely pass in the mating longitudinal slots 10 of the retaining ring 1. The axial width of the annular groove 9 of the retaining ring 1 is made somewhat greater than that of the projections 8 of the locking ring 3.

On the outer surface of the rotor body 2 of the electric machine (not shown) there is provided an annular groove 12 (FIG. 1) to receive the ring key 4.

The locking structure is assembled as follows.

The locking ring 3 is set on the rotor body 2, then the split ring key 4 is inserted into the annular groove 12 cut in the rotor body 2, and the fitting of the retaining ring 1 on the rotor body is performed according to the commonly used practice, the retaining ring 1 being preliminary heated.

After the retaining ring 1 cools, the locking ring 3 is heated to a temperature that permits its free placement in order to obtain the shrink fit with preset tightness over the cylindrical collar 6. The heated locking ring 3 is set on the retaining ring 1 in a way as to make the projections 8 of the locking ring 3 engage the mating slots 10 of the retaining ring 1. The fitting is performed until the projections 8 of the locking ring 3 are completely brought into the annular groove 9 of the retaining ring 1, and the ring bead 5 is pressed against the key 4. The locking ring 3 is further turned so as to make the axes of the projections 8 of the locking ring 3 align with those of the projections 11 of the retaining ring 1, thus forming a bayonet joint of said portions.

The locking structure disassembly is performed in a reverse order.

When the retaining ring 1 tends to shift axially towards the rotor tail piece, its projections 11 appear to be pressed against the projections of the locking ring 3. The locking ring 3 is retained from axial shift with respect to the rotor body 2 of the electric machine by means of the key 4.

Thus, according to the present invention, there is proposed an improved rotor end winding locking structure of a distributed polar electric machine of simple and, at the same time, reliable construction which facilitates assembly-disassembly.

On describing the preferred embodiment of the invention, discussed above, the specific narrow technical terms have been used for clear understanding. However, it is obvious to those skilled in the art that the invention is in no way restricted within chosen terms and that every such formulation covers all the mechanical equivalents, acting in the same manner and for the same purposes.

Although, the present invention has been hereinbefore described with reference to the preferred embodiment, it should be also apparent to those skilled in the art that various modifications and substitutions of mechanical equivalents might be made in the construction without departing from the spirit and scope of the invention.

All these changes are considered lying within the spirit and scope of the invention as defined by the ensuing claims.

What is claimed is:

1. In a locking structure for the rotor end winding of a distributed polar electric machine, comprising a retaining ring embracing the rotor end winding, a locking ring embracing said retaining ring and serving to fix it on the rotor body, said locking ring having bayonet joint portions on its inner surface at one end face thereof and a bead at its other end face, serving as a thrust for a ring key, the improvement residing in that the outer surface of the retaining ring has bayonet joint portions dimensioned and configurated to mate with said bayonet joint portions of said locking ring, while the ring key is located on the rotor body.

* * * * *